Sept. 6, 1949.　　　　　J. J. HARPER　　　　　2,481,214
VALVE
Filed Feb. 1, 1945
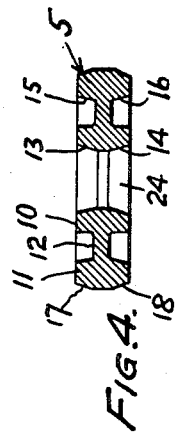
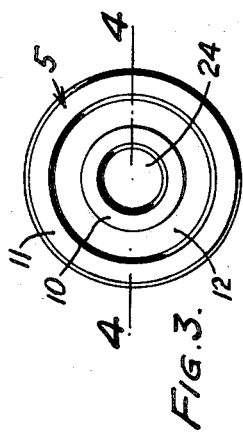
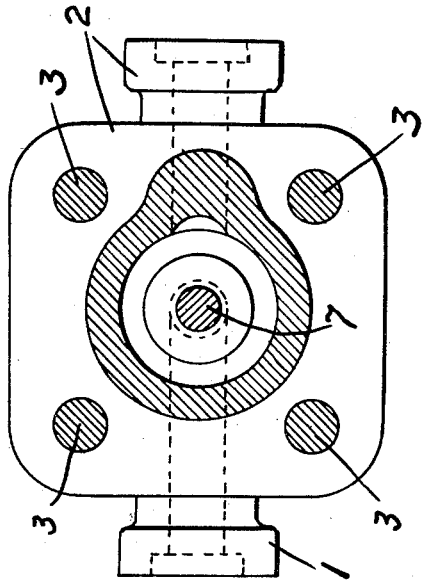
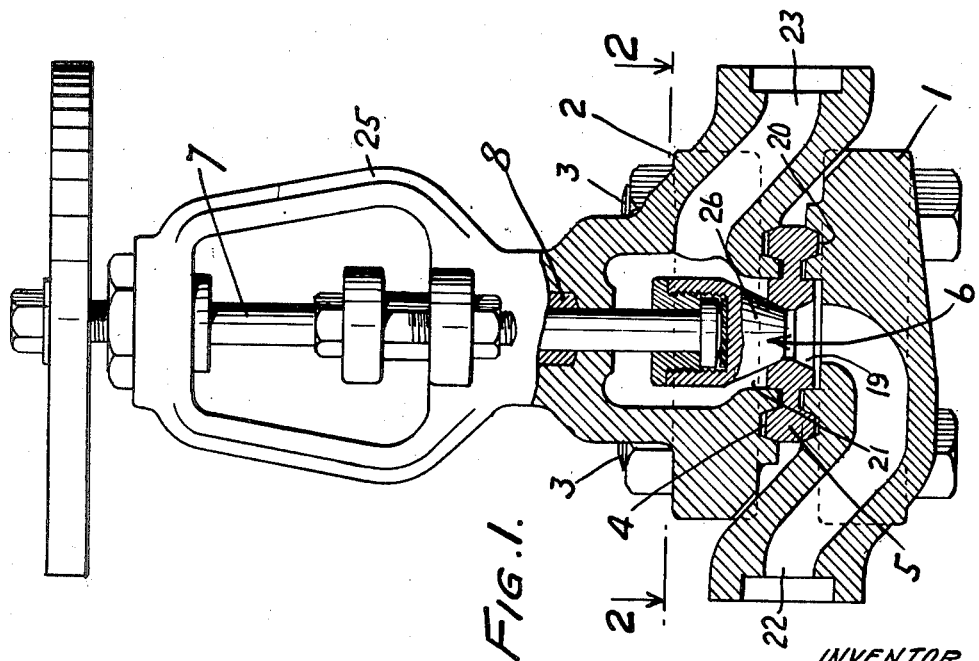
INVENTOR
Joseph J. Harper
BY
Augustus B. Stoughton
ATTORNEY.
WITNESS:

Patented Sept. 6, 1949

2,481,214

UNITED STATES PATENT OFFICE 2,481,214

VALVE

Joseph J. Harper, Lansdowne, Pa.

Application February 1, 1945, Serial No. 575,674

4 Claims. (Cl. 251—157)

My invention relates to valves and more particularly to renewable seat valves.

For certain types of service it is desirable to use valves having seats of special or hard metal different from that of the valve body. This is accomplished by making the seat integral with the body by welding, brazing or soldering, or by providing a renewable seat. The integral construction has the disadvantage that the valve must be discarded when the seat becomes unserviceable. Renewable seat valves heretofore available generally have the seats screw-threaded into the body and are objectionable in that they develop leaks through the threads, by-passing the seat.

The principal objects of the present invention are: to provide a valve in which these defects are remedied; to oppose or prevent seat bypass leakage; to provide for ready and convenient renewal of the seat; to permit of replacement of parts subject to wear, in most instances, without removal of the valve from the line; to permit of the replacement of parts without the use of special tools; to permit the valve to be serviced by ordinary mechanics; to provide a combination seat and seal unit that can be used in inverse position after the seat surface has been worn beyond the point where it can be re-ground; to eliminate the necessity of factory or shop repairs; to provide for the use of the valve as a straight or angle type by slight alteration in the relative positions; to provide, in unusual installations, where clearances are so close that piping cannot be sprung sufficiently for removal of the valve plug, a renewal that may be accomplished by cutting or disconnecting the valve from one line only; and generally to simplify the construction to facilitate the repair and improve the construction and operation of valves, particularly for use on high pressures.

Generally stated, the invention comprises the improvements to be presently described and finally claimed.

In the following description, reference will be made to the accompanying drawing forming part hereof and in which:

Fig. 1 is a side view partly in section of a valve embodying features of the invention;

Fig. 2 is a sectional view taken on the line 2—2 of Fig. 1;

Fig. 3 is a top or plan view of the valve seat drawn to an enlarged scale; and

Fig. 4 is a sectional view taken on the line 4—4 of Fig. 3.

Referring to the drawing, the valve is comprised essentially of a two-part body having a bottom part 1 detachably connected to a top part 2, a combination seat and seal member or ring 5 interposed between parts 1 and 2, and a retractable plug 6 mounted in the top part 2 and engageable with the seating face of ring 5.

The ring 5 is symmetrical about a plane transverse to its axis and comprises an annular inner seat portion or element 10 and an annular outer seal portion or element 11 of generally oblong sectional shape connected by a medial annular rib 12. The inner annular surfaces 13 and 14 of the seat 10, and the annular inner surfaces 15 and 16 and outer surfaces 17 and 18 of the seal 11 are beveled for a purpose to be presently described.

The top side of body part 1 is provided with a cylindrical aperture 19 to receive loosely the lower part of the seat 10 and with a concentric annular groove or recess 20 to receive tightly the lower part of the seal 11, said groove having its sides converging inwardly to complement surfaces 16 and 18.

The bottom of body part 2 is similarly provided with a cylindrical aperture 21 to receive the upper part of the seat 10 and with a concentric groove or recess 4, identical with groove 20, adapted to receive tightly the upper part of the seal 11.

Body part 1 is provided with a section 22 of the fluid-way communicating with the aperture 19. Body part 2 is provided with a section 23 of the fluid-way communicating with the aperture 21. Parts 1 and 2, with ring 5 interposed between them engaging grooves 4 and 20, are detachably connected by bolts 3 shown as four in number. The fluid-way is completed through the valve by way of section 22 and aperture 19 in the part 1, through the central opening 24 in ring 5, and through aperture 21 and section 23 in the part 2.

The valve plug 6 and its spindle 7, packed as at 8, may be of usual construction supported by the yoke 25, integral with part 2, for axial alignment with the ring 5. The seat engaging cone 26 of the plug 6 is suitably surfaced to complement the beveled surface 13 of seat 10. The valve seat surfaces 13 and 14 may be suitably faced with or constructed of hard metal especially adapted to perform the function required of it.

In use, the valve is interposed in the pipe line (not shown) and the connections between the inlet and outlet of the valve and the steam line made in the customary manner. For high pressure steam lines, these connections are usually made by welding the valve to the piping. In such case, removal of the ring 5 for replacement or for inversion to bring the lower beveled surface 14 into position as a seat for the plug 6, is readily accomplished without special tools by merely removing the bolts 3 and springing the line apart vertically to separate the body parts 1 and 2 for a sufficient distance. When it is desired to remove the plug 6, the pipes are also sprung laterally until the plug 6 can be removed downwardly past the edge of the lower body part 1. If the piping cannot be sprung to this extent, one pipe is cut and re-welded after the required changes are made.

As illustrated in the drawing, the parts of the valve are connected with inlet and outlet openings aligned to form a "straight through" valve but it is evident that the parts may be assembled with either part rotated horizontally at right angles to the position shown to form a right angle valve. It is obvious also that the valve may be constructed with a greater number of bolts symmetrically distributed to give any desired angle of the fluid-way.

Although I have shown the seal surfaces 15, 16, 17 and 18 as being of beveled or conical construction, it is to be understood that these surfaces may be otherwise shaped provided that they engage the recesses 4 of valve parts 1 and 2 with a wedging action.

It will be obvious to those skilled in the art that modifications may be made in details of construction and arrangement without departing from the spirit of the invention.

I claim:

1. A valve comprising a body constructed in two parts, of which each of the parts is provided with a section of the fluid-way and a generally V-shaped annular recess, a combination seat and seal member comprising an annular seal element of generally oblong sectional shape having the longer principal axis of the element parallel to the axis of said seal element and with the ends of the element beveled to complement the shape of said recess and to engage the same with a wedging action, and an inner annular seat element integrally attached to said seal element, said seal element being positioned between said parts with the ends of the element respectively engaging said recesses to seal the fluid-way, a plug carried by one of said body parts and engageable with said seat element, and means for detachably holding said parts together under pressure.

2. In combination with a valve comprising a body constructed in two parts of which each of the parts is provided with a section of the fluid-way and a generally V-shaped annular recess, a renewable seat and seal unit comprising an annular seal element of generally oblong sectional shape having the longer principal axis of the element parallel to the axis of said element and engaging said recesses with a wedging action, an annular seat element smaller in diameter than said seal element, and a disc element, said seat element being disposed concentrically within said seal element and said disc element being disposed between said seal and seat elements and integrally attached to the inner periphery of the seal element and to the outer periphery of the seat element.

3. The invention set forth in claim 2 characterized in that said ring is symmetrical about a plane transverse to its axis.

4. The invention set forth in claim 2 characterized in that said ring is symmetrical about a plane transverse to its axis and that the inner annular surface of said seat element is beveled outwardly from said plane.

JOSEPH J. HARPER.

REFERENCES CITED

The following references are of record in the file of this patent:

UNITED STATES PATENTS

| Number | Name | Date |
| --- | --- | --- |
| 508,765 | Rouse | Nov. 14, 1893 |
| 2,117,853 | Queen | May 17, 1938 |
| 2,225,838 | Miller | Dec. 24, 1940 |
| 2,301,976 | Schellens | Nov. 17, 1942 |

FOREIGN PATENTS

| Number | Country | Date |
| --- | --- | --- |
| 669,020 | France | 1929 |